United States Patent
Chowdhery et al.

(10) Patent No.: US 9,768,894 B2
(45) Date of Patent: Sep. 19, 2017

(54) SPECTRUM SLEUTH FOR IDENTIFYING RF TRANSMITTER IN AN ENVIRONMENT

(71) Applicant: Microsoft Technology Licensing, LLC., Redmond, WA (US)

(72) Inventors: Aakanksha Chowdhery, Seattle, WA (US); Mariya Zheleva, Albany, NY (US); Ranveer Chandra, Kirkland, WA (US); Ashish Kapoor, Kirkland, WA (US); Paul Garnett, Fremont, CA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 14/822,177

(22) Filed: Aug. 10, 2015

(65) Prior Publication Data

US 2017/0048010 A1    Feb. 16, 2017

(51) Int. Cl.
*H04B 17/00* (2015.01)
*H04B 17/309* (2015.01)
*H04W 24/10* (2009.01)
*H04B 17/391* (2015.01)

(52) U.S. Cl.
CPC .......... *H04B 17/309* (2015.01); *H04W 24/10* (2013.01); *H04B 17/391* (2015.01)

(58) Field of Classification Search
CPC ..... H04W 16/14; H04W 24/08; H04W 24/02; H04W 24/10; H04W 28/16; H04W 64/006; H04W 72/0453; H04W 8/005; H04W 24/00; H04W 4/028; H04W 52/225; H04W 52/343; H04W 52/42; H04W 72/04; H04W 72/0413; H04W 72/0446; H04W 72/048; H04B 17/309; H04B 17/318; H04B 17/10; H04B 17/23; H04B 17/26; H04B 17/27; H04B 17/327; H04B 17/3911; H04B 1/7075; H04B 1/7085; H04B 1/7143; H04B 7/01; H04B 7/0408; H04B 7/12
See application file for complete search history.

(56) References Cited

U.S. PATENT DOCUMENTS

| 5,329,591 | A | 7/1994 | Magrill |
| 7,058,530 | B1 | 6/2006 | Miller et al. |
| 7,957,451 | B1 * | 6/2011 | Baugh ............... H04B 1/7143 375/132 |
| 8,077,079 | B2 | 12/2011 | Kaiser et al. |
| 8,135,424 | B2 | 3/2012 | Rao et al. |
| 8,675,781 | B2 | 3/2014 | Adnani et al. |
| 2009/0102981 | A1 | 4/2009 | Mody |

(Continued)

OTHER PUBLICATIONS

"Spectrum Monitoring", Retrieved on: Jun. 5, 2015 Available at: https://keybridgeglobal.com/products/spectrum-monitoring/index.xhtml;jsessionid=3161c5ec01f124213bf7b6d688e2.

(Continued)

*Primary Examiner* — Golam Sorowar
(74) *Attorney, Agent, or Firm* — A.C. Entis-IP Ltd.

(57) ABSTRACT

A method for monitoring radio frequency (RF) transmitters in an environment, that fits a probability mixture model (PMM) comprising a plurality of probability density functions (PDFs) at least two of which are of a different type, to RF power measurements of RF signals received in the environment to determine a number and characteristics of RF transmitters operating in the environment.

17 Claims, 5 Drawing Sheets

(56) References Cited

U.S. PATENT DOCUMENTS

| | | | |
|---|---|---|---|
| 2010/0014616 A1* | 1/2010 | Coulson | H04B 1/1027 375/341 |
| 2012/0120887 A1 | 5/2012 | Deaton et al. | |
| 2013/0029706 A1 | 1/2013 | Sachs et al. | |
| 2015/0180689 A1* | 6/2015 | Deriche | H04L 27/0006 370/330 |
| 2015/0271687 A1* | 9/2015 | Fechtel | H04W 24/02 370/252 |

OTHER PUBLICATIONS

Zhao, et al., "A Survey of Dynamic Spectrum Access", In Proceedings of IEEE of Signal Processing Magazine, May 2007, pp. 79-89.

Jabbari, et al., "Dynamic Spectrum Access and Management", In Proceedings of IEEE Wireless Communications, vol. 17, Issue 4, Aug. 2010, pp. 6-15.

Liu, et al., "Cooperative Spectrum Detection Technology", In Proceedings of the 2nd International Conference on Computer Application and System Modeling, Jul. 27, 2012, pp. 0324-0327.

Serinken, et al., "An Evaluation of the MoTron TxID-1 Transmitter Fingerprinting System", In Technical Report, Feb. 1997, 11 pages.

Shi, et al., "Beyond Sensing: Multi-GHz Realtime Spectrum Analytics", In Proceedings of the 12th USENIX Symposium on Networked Systems Design and Implementation, May 4, 2015, pp. 159-172.

"Spectrum Monitoring—Routine Measurements", Published on: Jan. 26, 2013 Available at: http://www.rohde-schwarz.com/en/solutions/government_security/spectrum-monitoring/challenges/routinemeasurements_91390.html.

Marcus, et al., "Inventory and review of spectrum use: Assessment of the EU potential for improving spectrum efficiency", In WIK-Consult Final Report, Sep. 11, 2012, 145 pages.

Chen, et al., "Mining Spectrum Usage Data: a Large-scale Spectrum Measurement Study", In Proceedings of Annual International Conference on Mobile Computing and Networking, Sep. 20, 2009, pp. 13-24.

Chowdhery, et al., "Characterizing Spectrum Goodness for Dynamic Spectrum Access", In Proceedings of IEEE 50th Allerton Conference on Communication, Control and Computing, Oct. 2012, 8 pages.

Downes, Larry, "Snowe, Kerry Introduce Spectrum Inventory Bill", Published on: Mar. 2, 2011 Available at: http://www.cnet.com/news/snowe-kerry-introduce-spectrum-inventory-bill/.

Goldsmith, Andrea, "Wireless Communications", In Cambridge University Press, Jun. 2012, 3 pages.

Gorin, Joe, "Detector Selection for Spectrum Analyser Measurements", Published on: Feb. 2003 Available at: http://mobiledevdesign.com/site-files/mobiledevdesign.com/files/archive/mobiledevdesign.com/images/archive/302Gorin32(1).pdf.

Hong, et al., "DOF: A Local Wireless Information Plane", In Proceedings of ACM SIGCOMM Conference, Aug. 15, 2011, pp. 230-241.

Iyer, et al., "Specnet: Spectrum sensing sans frontières", In Proceedings of the 8th USENIX Symposium on Networked Systems Design and Implementation, Mar. 30, 2011, 14 pages.

Kone, et al., "On the Feasibility of Effective Opportunistic Spectrum Access", In Proceedings of the 10th ACM SIGCOMM Conference on Internet Measurement, Nov. 1, 2010, 14 pages.

McHenry, et al., "Chicago Spectrum Occupancy Measurements and Analysis and a Long-term Studies", In Technical Report, Shared Spectrum Company, Aug. 2006, 12 pages.

Nguyen, et al., "On Identifying Primary user Emulation Attacks in Cognitive Radio Systems using Nonparametric Bayesian Classification", In IEEE Transactions on Signal Processing, Mar. 2012, pp. 1432-1445.

Rayanchu, et al., Airshark: Detecting non-WiFi RF Devices Using Commodity WiFi Hardware, In Proceedings of the ACM SIGCOMM Conference on Internet Measurement Conference, Nov. 2, 2011, 14 pages.

Wellens, et al., "Lessons Learned From an Extensive Spectrum Occupancy Measurement Campaign and a Stochastic Duty Cycle Model", In Proceedings of 5th International Conference on Testbeds and Research Infrastructures for the Development of Networks & Communities and Workshops, Apr. 6, 2009, 9 pages.

Yang, et al., "Supporting Demanding Wireless Applications with Frequency-agile Radios", In Proceedings of 7th USENIX Symposium on Networked Systems Design and Implementation, Apr. 28, 2010, 15 pages.

Yedidia, et al., "Constructing Free-energy Approximations and Generalized belief Propagation Algorithms", In IEEE Transactions on Information Theory vol. 51 Issue 7, Jul. 2005, pp. 2282-2312.

Zheleva, "Modular wireless networks for infrastructure-challenged environments", University of California, Sep. 2014, pp. 1-251.

Bassem Zayen et al., Performance Comparison for Low Complexity Blind Sensing Techniques in Cognitive Radio Systems, Cognitive Information Processing, Jun. 14, 2010, pp. 328-332.

Zheleva Mariya et al., TxMiner: Identifying transmitters in real-world spectrum measurments, Sep. 29, 2015, pp. 94-105.

Dobre Octavia, Signal identification for emerging intelligent radios: classical problems and new challenges, vol. 18 No. 2, Apr. 1, 2015, p. 11-17.

International Search Report and Written Opinion, dated Oct. 17, 2016; Application No. PCT/US2016/046107; Filing date: Aug. 9, 2016.

* cited by examiner

SPECTRUM SLEUTH FOR IDENTIFYING RF TRANSMITTER IN AN ENVIRONMENT

BACKGROUND

The radio frequency (RF) portion of the electromagnetic spectrum that is used for wireless communication supports a plethora of different communication applications such as mobile voice and data communications, FM and AM radio, TV, remote surveillance and sensor monitoring, and with increasing frequency, control of robotic machines, vehicles, and aerial drones. Monitoring and characterizing use of the RF spectrum is integral to regulating the spectrum and allocating and policing use of frequency channels in the spectrum so that the spectrum may enable satisfactory functioning of the different communication tasks for which it is used. Effective monitoring and policing of the RF spectrum typically depends on methods of detecting and identifying licensed and/or pirate transmitters that use the RF spectrum and determining at least one, or a combination of more than one, of their respective transmission bandwidths, percentages of time they use their bandwidths, transmission intensities, and/or coding formats.

SUMMARY

An aspect of an embodiment of the disclosure relates to providing apparatus, hereinafter also referred to as "RF-Sleuth", for monitoring and managing use of the RF spectrum. RF-Sleuth optionally comprises at least one RF listening station configured to acquire measurements of power as a function of time and frequency of RF signals that it receives at the location of each of the at least one RF listening station. RF-Sleuth comprises a processor that receives and processes the RF power measurements, optionally in accordance with an unsupervised machine learning procedure, to identify at least one RF transmitter that generates the RF signals received by the at least one listening station. In an embodiment the processor models a probability density function (PDF), also referred to as an "RF" probability mixture model (RF-PMM), for the RF power of the received RF signals. The RF-PMM comprises a sum of PDFs, also referred to as "RF-PDFs", at least two of which have a different form. The sum may comprise a different RF-PDF, for each of the at least one RF transmitter that the processor identifies as contributing to the received RF signals, and an RF-PDF for RF noise that contributes to the received signals. The processor fits the RF-PMM, to the RF power measurements to determine a number of the at least one transmitter, and parameters that define the RF-PDF associated with each of the at least one transmitter and the RF-PDF for the RF noise. An RF transmitter for which the RF-PMM comprises an RF-PDF may be referred to as an "identified transmitter". In an embodiment, the RF-PDF for the amplitude of the RF noise may be modeled as a Gaussian PDF, and the RF-PDF for the amplitude of a transmitter of the at least one identified transmitter may be modeled as a Rayleigh PDF.

In an embodiment, the processor uses the RF-PDFs determined for the RF transmitters identified in the RF-PMM to determine for each of a plurality of RF power measurements acquired by the at least one RF listening station an "association likelihood" for the RF power measurement and the identified RF transmitters. The association likelihood for a given RF power measurement and a given identified RF transmitter provides a likelihood that the given identified RF transmitter generated the RF signal for which the given RF power measurement was acquired. The association likelihoods are functions of the respective times and frequencies of the RF power measurements with which they are associated. In an embodiment, the RF-Sleuth processor integrates association likelihoods, or under the assumption that the association likelihoods are discrete variables, sums association likelihoods, for a given identified transmitter over time to provide a frequency signature for the identified transmitter. A bandwidth for the identified transmitter may be determined responsive to the frequency signature. In an embodiment, the RF-Sleuth processor integrates, or sums, the association likelihoods over frequency to provide a temporal signature for the identified transmitter. A percentage of the time, hereinafter also referred to as a "use duty cycle", that the identified transmitter transmits may be determined responsive to the temporal signature. Hereinafter "integrate" may be used generically to indicate integration of a continuous variable or summation of a discrete variable over a range of the variable.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

In the following detailed description a schematic of an RF-Sleuth operating to monitor RF signals, optionally in a region of a city environment, and a visualization of an array of RF power measurements for the RF signals that the RF-Sleuth acquires are discussed with reference to FIGS. 1A and 1B respectively. FIG. 2 shows a flow diagram of a procedure performed by a processor comprised in the RF-Sleuth to process the RF power measurements acquired by RF-Sleuth and identify RF transmitters in the city environment. An overview of a procedure in accordance with an embodiment of the disclosure for fitting an RF-PMM comprising Rayleigh and Gaussian PDFs to RF power measurements acquired by RF-Sleuth is illustrated by the flow diagram in FIG. 3 and discussed with reference to the flow diagram. An iterative method for fitting an RF-PMM to RF power measurements in accordance with an embodiment of the disclosure that comprises iteratively partitioning RF power measurements into sub-blocks of RF power measurements is discussed with reference to the flow diagram in FIG. 4.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins.

Figure 1A:
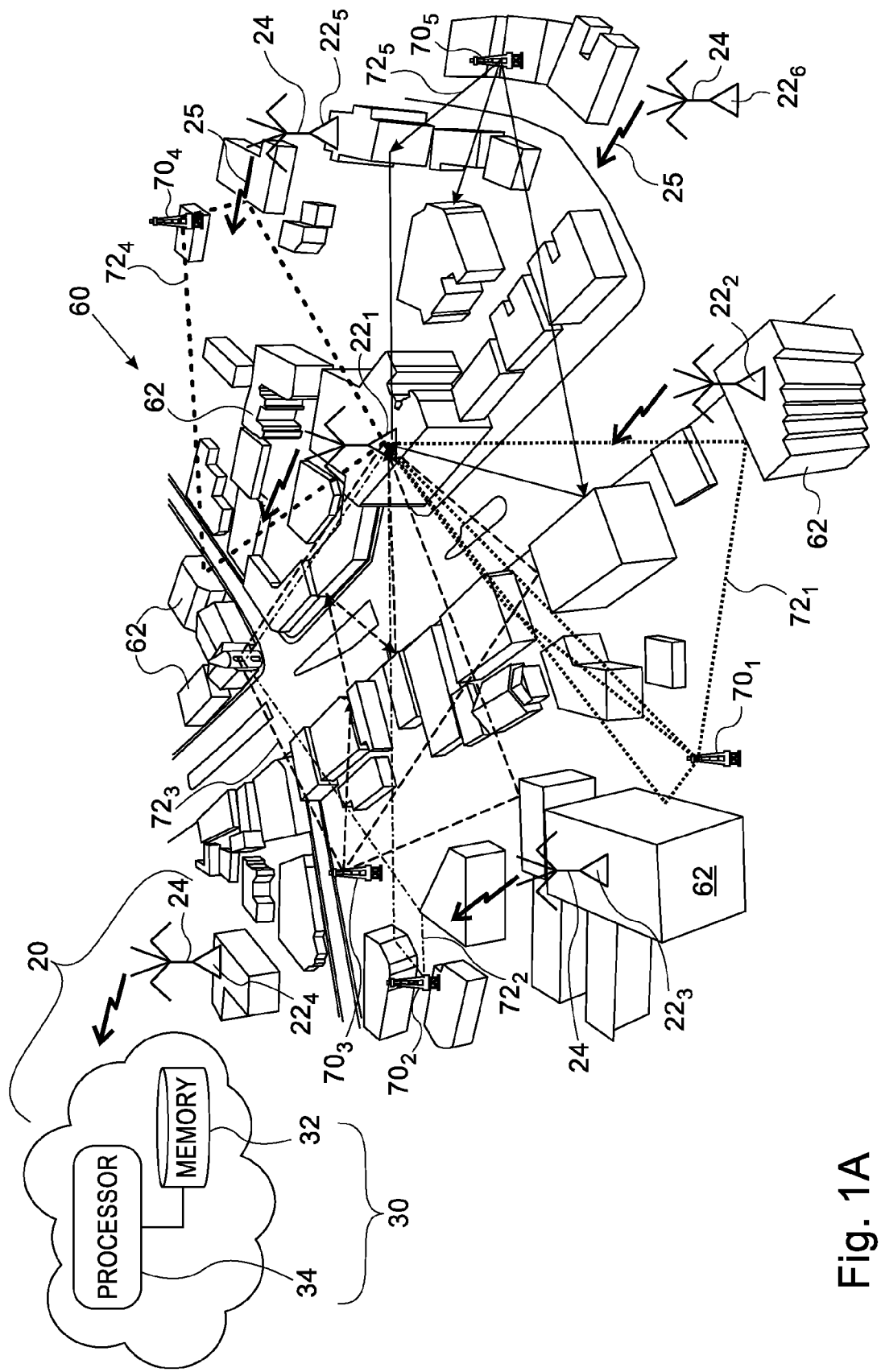
FIG. 1A schematically shows an RF-Sleuth monitoring RF signals in a city environment, in accordance with an embodiment of the disclosure.

FIG. 1A schematically shows an RF-Sleuth 20 monitoring RF transmissions in a city environment 60 in accordance with an embodiment of the disclosure. City environment 60 comprises a plurality of buildings 62, and by way of example, a plurality of, "K", RF transmitters $70_k$, $1 \leq k \leq K$ operating within the city environment. A given RF transmitter $70_k$ may be any one of various stationary or mobile RF transmitters used to communicate video, voice, and/or data. By way of example, a given RF transmitter $70_k$ may be a base station RF transmitter comprised in a mobile phone network, a WiFi hot spot, a Bluetooth transmitter, a radio or TV station transmitter, an airport control tower transmitter, a radar transmitter, a transmitter used to control a remote piloted land vehicle or aerial drone, or a rogue RF transmitter. Transmitters $70_k$ may be referred to generically by the numeral 70 without the subscript k. Whereas in FIG. 1, as shown by way of example K=5, an environment monitored by an RF-Sleuth in accordance with an embodiment of the disclosure may have a number of active transmitters operating in its environs that is more or less than five.

RF-Sleuth 20 comprises, optionally a plurality of, "M", RF listening stations $22_m$, $1 \leq m \leq M$, optionally referred to generically by the numeral 22, and an optionally cloud based data processing hub 30. Each listening station 22 comprises at least one, optionally multi-polarized, antenna 24 and circuitry (not shown) that are configured for receiving RF signals in a desired "listening" bandwidth of the listening station and determining RF power measurements of the received signals. The listening station also comprises a wire and/or wireless communication interface (not shown) for transmitting the RF power measurements it acquires to RF-Sleuth hub 30 for processing. Lightning arrows 25 schematically represent listing stations 22 transmitting RF power measurements to RF-Sleuth hub 30. Whereas, by way of example, in FIG. 1A, RF-Sleuth 20 comprises 5 RF listening stations $22_m$ and M=6, practice of an embodiment of the disclosure and an RF-Sleuth are not limited to six listening stations. An RF sleuth in accordance with an embodiment of the disclosure may comprise a number of listening stations that is more or less than six.

RF-Sleuth hub 30 optionally comprises a memory 32 for storing RF power measurements it receives from RF listening stations 22 and a processor 34 for processing the measurements to identify RF transmitters that generate the RF signals for which the listening stations acquire the RF power measurements. Processor 34 may comprise any electronic and/or optical processing and/or control circuitry known in the art and may, by way of example, comprise any one or any combination of more than one, of a microprocessor, an application specific circuit (ASIC), field programmable array (FPGA), and/or system on a chip (SOC). Memory 32 may comprise any electronic and/or optical circuitry suitable for storing data and/or computer executable instructions and may, by way of example, comprise any one or any combination of more than one of a flash memory, random access memory (RAM), read only memory (ROM), erasable programmable read-only memory (EPROM), CD-ROM, or DVD.

Whereas processor 34 is schematically shown in FIG. 1A as a single processor, the processor may have a distributed configuration with components at different locations and/or may be a virtualized processor. Similarly, memory 32 may be a localized memory or have a distributed configuration with components at different locations. And whereas RF-Sleuth hub 30 is shown in FIG. 1A as a cloud based hub, an RF-Sleuth hub in accordance with an embodiment may be a hub that is accessible for example via dedicated non-internet communication channels.

In operation, RF-Sleuth 20 may be configured to identify RF transmitters operating in city environment 60 that transmit in a desired "identification" bandwidth responsive to signals generated by the RF transmitters that are received by RF listening stations 22. An RF transmitter is considered to be operating in the city environment if RF signals that it generates are received by an RF listening station 22. By way of example, the identification bandwidth of RF-Sleuth 20 may be a relatively large bandwidth that extends from about 30 MHz (megahertz) to about 6 GHz (gigahertz), a smaller S-band identification bandwidth that extends between 2 GHz to about 4 GHz, or a relatively small identification bandwidth used for mobile satellite service that extends from about 2.0 GHz to about 2.2 GHz. The listening bandwidth of a given listening station 22 may be coextensive with the identification bandwidth of RF-Sleuth 20 or overlap with only a portion of the identification bandwidth.

In city environment 60, because of the relative abundance of buildings 62, direct line of sight signal transmission between a transmitter 70 and a listening station 22 may be relatively infrequent. Most RF signals from transmitters 70 reach an RF listening station 22 via multipath propagation for which the signals transmitted by the transmitters are reflected and/or refracted at least once before reaching the RF listening station. In FIG. 1A multipath propagation of RF signals transmitted by RF transmitters $70_1, 70_2, \ldots 70_5$ that are received by RF listing station $22_1$ are schematically indicated by stylized, piecewise linear lines $72_1, 72_2, \ldots 72_5$ respectively.

Let $s(t,f)^2$ represent an RF power measurement that an RF listening station 22 determines for an RF signal having amplitude $s(t,f)$, which the listening station receives at a time t, and at RF frequency f. Arguments t and f are optionally discrete time and frequency indices for which, $1 \leq t \leq T$ and $1 \leq f \leq F$ respectively. A measurement $s(t,f)^2$ may be proportional to a peak or average power that the signal exhibits for a given delimited frequency range during a given scan time interval. By way of example, the RF power measurements may be acquired in frequency steps of 400 kHz for delimited frequency ranges, optionally referred to as frequency bins, equal to about 6 MHz and scan time intervals, optionally referred to as time bins, of between 100 s (seconds) to about 300 s.

Figure 1B:
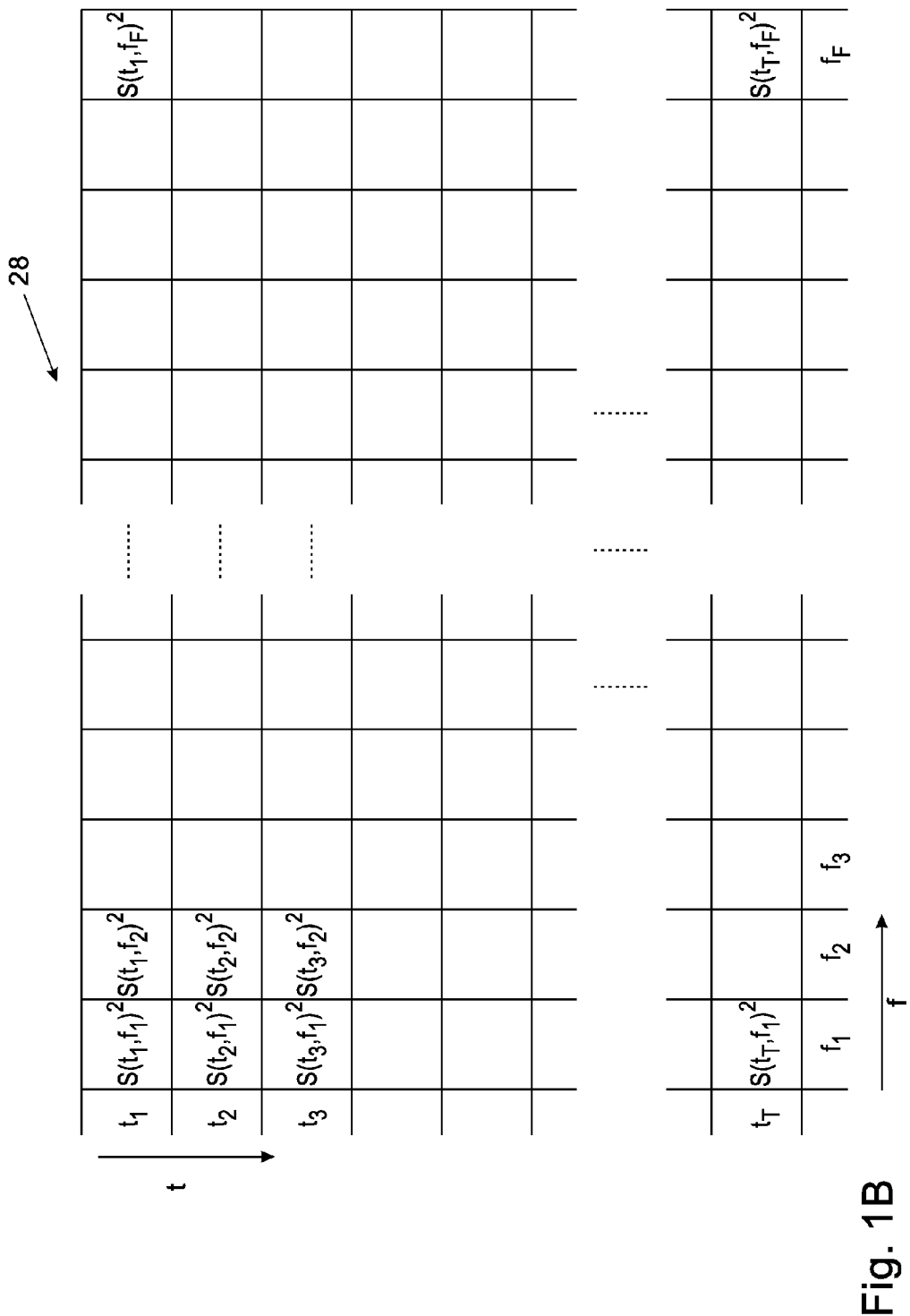
FIG. 1B schematically shows an array of RF power measurements acquired for the RF signals monitored by the RF-Sleuth shown in FIG. 1A in accordance with an embodiment of the disclosure.
Figure 2:
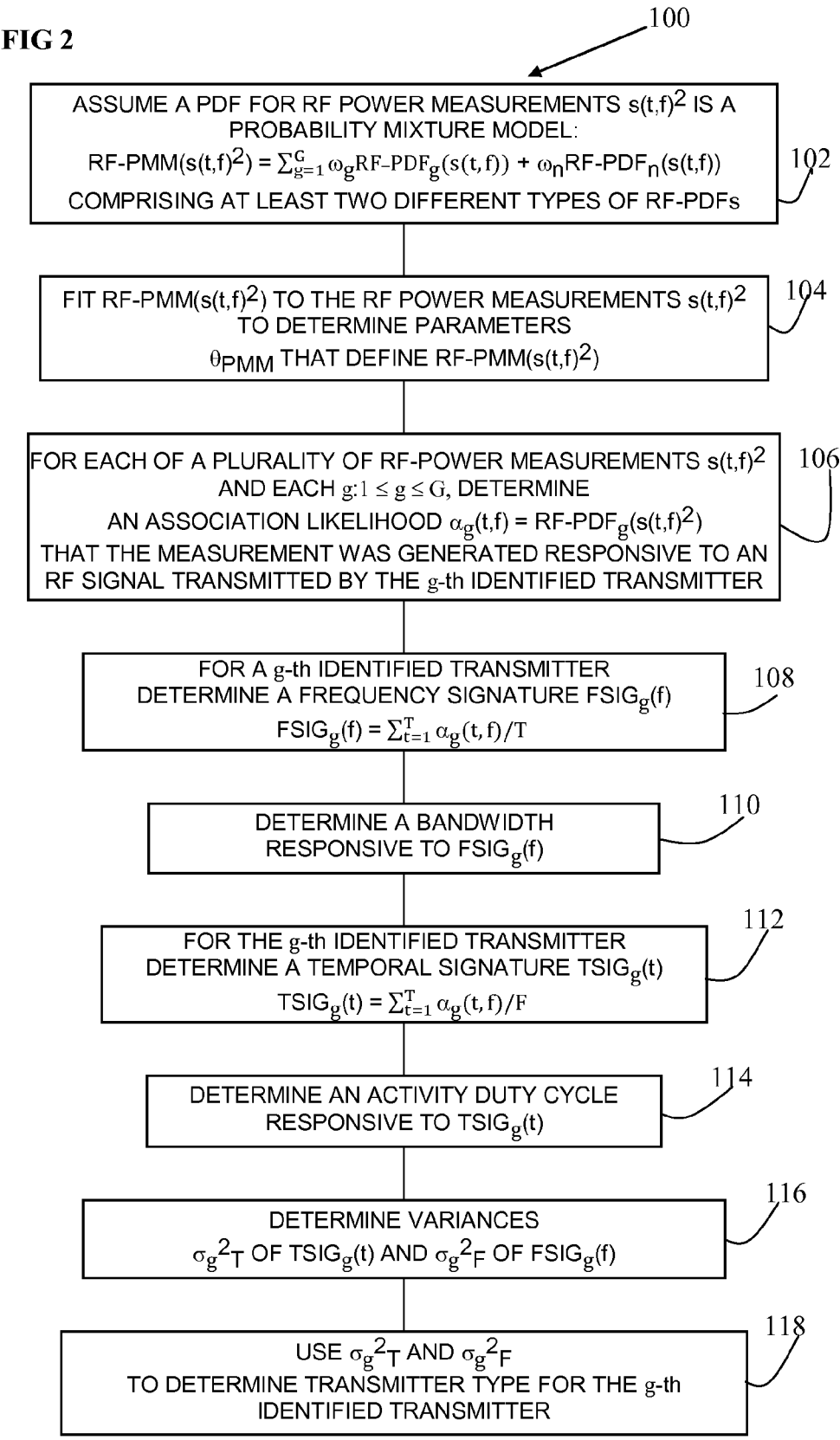
FIG. 2 shows a flow diagram of a procedure by which the RF-Sleuth shown in FIG. 1 processes RF measurements it acquires to identify RF transmitters in the city environment, in accordance with an embodiment of the disclosure.

FIG. 1B shows a plurality of RF power measurements $s(t,f)^2$ that RF listening stations 22 may acquire and transmit to RF-Sleuth hub 30 for processing schematically arrayed in a time and frequency, "power spectrum distribution" (PSD) data matrix 28. PSD data matrix 28 has T time bins identified by discrete times $t_1, t_2, t_3, \ldots t_T$, and F frequency bins identified by discrete frequencies $f_1, f_2, f_3, \ldots f_F$. For each time bin, PSD data matrix 28 may have a maximum of F discrete RF power measurements $s(t,f)^2$, and for each frequency bin a maximum of T discrete RF power measurements $s(t,f)^2$.

In an embodiment, processor 34 processes the RF power measurements $s(t,f)^2$ to identify transmitters 70 in accordance with an embodiment of a procedure, an overview of which is provided in a flow diagram 100 in FIG. 2.

In a block 102 processor 34 optionally models a PDF for RF power measurements $s(t,f)^2$ that RF-Sleuth hub 30 receives from RF listening stations 22 as an RF probability mixture model (RF-PMM) of a form, $$RF\text{-}PMM(s(t,f)^2) = \Sigma_{g=1}^{G} \omega_g RF\text{-}PDF_g(s(t,f)) + \omega_n RF\text{-}PDF_n(s(t,f)). \quad (1)$$

Expression (1) assumes there are "G" RF transmitters active in city environment 60 and a source (not shown) of RF noise in the environment that contribute to RF power measurements $s(t,f)^2$ acquired by RF-Sleuth 20 from RF listening stations 22. In the expression, a PDF for receiving an RF power measurement $s(t,f)^2$ responsive to an RF signal generated by a given "g-th" transmitter is represented by "RF-PDF$_g$". A PDF for receiving an RF power measurement $s(t,f)^2$ responsive to a signal from the source of RF noise is represented by "RF-PDF$_n(s(t,f))$". A weight $\omega_g$ that multiplies the RF-PDF$_g$ for the g-th transmitter determines how much the g-th RF-transmitter contributes to RF-PMM$(s(t,f)^2)$. The weight $\omega_n$ determines how much the source of RF noise contributes to RF-PMM$(s(t,f)^2)$. The weights are constrained by a condition $\Sigma_{g=1}^{G}\omega_g + \omega_n = 1$. In an embodiment of the disclosure at least two of the PDFs that contribute to RF-PMM$(s(t,f)^2)$, have a different form. That is, at least two of PDFs—RF-PDF$_1(s(t,f))$, RF-PDF$_2(s(t,f))$, ..., RF-PDF$_G(s(t,f))$, and RF-PDF$_n(s(t,f))$—are different types of PDFs.

By way of example, for city environment 60, in an embodiment of the disclosure, processor 34 may model the power distribution function RF-PDF$_g(s(t,f))$ for the g-th transmitter as a Rayleigh distribution function, so that, $$RF\text{-}PDF_g(s(t,f)) = R_g(s,\lambda_g) = (\pi s/2\lambda_g)\exp{-\pi s^2/4\lambda_g^2}. \quad (2)$$

In expression (2), $4\lambda_g^2/\pi$ is an average RF power measurement determined for signals received by RF listening stations 22 from the g-th transmitter. Processor 34 may model the power distribution function RF-PDF$_n(s(t,f))$ for signals received by RF listening stations 22 from the RF noise source, optionally, as a normal, Gaussian, distribution $N(s,\mu_n,\sigma_n^2)$ so that, $$RF\text{-}PDF_n(s(t,f)) = N(s,\mu_n,\sigma_n^2) = [1/(\sigma_n\sqrt{(2\pi)})]\exp-[(s-\mu_n)^2/2\sigma_n^2]. \quad (3)$$

Using expressions (2) and (3), RF-PMM$(s(t,f)^2)$ may be written, $$RF\text{-}PMM(s(t,f)^2) = \sum_{g=1}^{G} \omega_g R_g(s,\lambda_g) + \omega_n N(s,\mu_n,\sigma_n^2) \quad (4)$$

$$= \sum_{g=1}^{G} \omega_g(\pi s/2\lambda_g)\exp-\pi s^2/4\lambda_g^2 +$$

$$[1/(\sigma_n\sqrt{(2\pi)})]\exp-[(s-\mu_n)^2/2\sigma_n^2]$$

In expressions (2)-(4) and expressions that follow the time and frequency arguments of $s(t,f)$ may be omitted for convenience of presentation, and $s(t,f)$ may be written "s". RF-PMM$(s(t,f)^2)$ defined by equation (4) may be referred to as a Rayleigh-Gaussian RF-PMM denoted by "RF-RGMM$(s(t,f)^2)$", or "RF-RGMM".

In a block 104 processor 34 fits RF-PMM$(s(t,f)^2)$ to RF power measurements $s(t,f)^2$ to determine "best fit" values for a set of parameters, hereinafter represented by "$\theta_{PMM}$", that define RF-PMM$(s(t,f)^2)$ and provide information as to a number of transmitters active in city environment 60 and characteristics of the transmitters. The set of defining parameters $\theta_{PMM}$ includes the number G of RF transmitters identified by the process of fitting RF-PMM$(s(t,f)^2)$ to the RF power measurements, weights $\omega_g$ and $\omega_n$, and parameters that define the PDFs, RF-PDF$_g(s(t,f))$ and RF-PDF$_n(s(t,f))$. For RF-RGMM$(s(t,f)^2)$, defining parameters $\theta_{PMM}$, may be denoted "$\theta_{RGMM}$" and include G, $\lambda_g$, and weights $\omega_g$ for Rayleigh RF transmitter distributions $R_g(s, \lambda_g)$, $1 \le g \le G$, and $\omega_n$, $\sigma_n$, and $\mu_n$ for normal, "noise", distribution $N(s,\mu_n,\sigma_n^2)$. Details of procedures for determining best fit values for defining parameters $\theta_{RGMM}$ for RF-RGMM$(s(t,f)^2)$ in accordance with an embodiment of the disclosure are described below.

The adjectival phrase "best fit", refers to values for defining parameters of a PDF, such as defining parameters represented by $\theta_{PMM}$ or $\theta_{RGMM}$, that are returned by a fitting procedure, generally, subject to the values satisfying an appropriate "goodness of fit" constraint, upon completion of the fitting procedure. Best fit values for a PDF's defining parameters may be referred to simply as best fit defining parameters of the PDF. For example, best fit values for $\theta_{PMM}$ or $\theta_{RGMM}$ may be referred to as best fit $\theta_{PMM}$ or best fit $\theta_{RGMM}$ respectively.

In a block 106, for each of a plurality of RF power measurements $s(t,f)^2$, processor 34 determines an association probability, $\alpha_g(t,f)$, for the RF power measurement acquired at time t for frequency f, and each g-th identified RF transmitter. Processor may also determine an association probability, $\alpha_n(t,f)$, for the RF power measurement and the source of RF noise. The association probability $\alpha_g(t,f)$ for a given RF power measurement and a g-th identified RF transmitter provides a measure as to how probable the given RF power measurement was acquired for a signal generated by the g-th RF transmitter. The association probability $\alpha_n(t,f)$ for the given RF power measurement and the source of RF noise provides a measure as to how probable the given RF power measurement was acquired for a signal generated by RF noise. The g-th association probabilities $\alpha_g(t,f)$ and $\alpha_n(t,f)$ may be defined by, $$\alpha_g(s(t,f)) = RF\text{-}PDF_g(s(t,f)) \text{ and } \alpha_n(s(t,f)) = RF\text{-}PDF_n(s(t,f)). \quad (5)$$

For RF-RGMM$(s(t,f)^2)$, the association probabilities may be defined by, $$\alpha_g(s(t,f)) = R_g(s,\lambda_g) = (\pi s/2\lambda_g)\exp-\pi s^2/4\lambda_g^2 \text{ and } \alpha_n(s(t,f)) = N(s,\mu_n,\sigma_n^2) = [1/(\sigma_n\sqrt{(2\pi)})]\exp-[(s-\mu_n)^2/2\sigma_n^2] \quad (6)$$

In an embodiment of the disclosure the association probabilities may be used, as discussed below, to determine characteristics of RF transmitters identified in RF-PMM(s $(t,f)^2$). Optionally, before use, values for $\alpha_g(s(t,f))$ and $\alpha_n(s(t,f))$ given by expressions (5) and (6) may be smoothed over time and frequency to moderate effects of RF noise that degrades RF power measurements $s(t,f)^2$ and improve consistency between association probabilities of neighboring time and frequency bins in PSD data matrix 28 (FIG. 1B).

Smoothing may be performed by processing the association probabilities with any of various low pass filters, such as by way of example neighborhood averaging filters, median filters, or mode filters that are used to remove high spatial frequency noise in digital images. In an embodiment smoothing may be performed by minimizing a suitable energy function of the association probabilities $\alpha_g(s(t,f))$ and $\alpha_n(s(t,f))$. If, "k" is an index which may assume a value of any of the indices g, $1 \leq g \leq G$, and n, the energy function for a given k may be written $E_k(\alpha_k(s(t,f)))$. In an embodiment, $E_k(\alpha_k(s(t,f)))$ may be defined by an expression, $$E_k(\alpha_k(s(t,f))) = \Sigma_s - \log(\alpha_k(s(t,f))) + \Sigma_{s,s^*} V_k(s,s^*). \quad (7)$$

In expression (7) $\Sigma_s$ indicates performing a sum over the RF power measurement $s(t,f)^2$ used in determining best fit $\theta_{PMM}$ for RF-PMM($s(t,f)^2$). $V_k(s,s^*)$ is a biasing energy Argument $s^*$ represents an RF power measurement, $s^*(t,f)^2$, acquired for a time and frequency bin that neighbors the time and frequency bin for which an RF power measurement $s(t,f)^2$ is acquired. $\Sigma_{s,s}^*$ indicates performing a sum over all s, and for each s for all neighboring RF power measurement $s^*$. The biasing energy may be configured to increase with increasing magnitude of a difference between the magnitudes of $s(t,f)^2$ and $s^*(t,f)^2$. In an embodiment, $$V_k(s,s^*) = -\log[\exp-\beta|s(t,f)^2 - s^*(t,f)^2|] \text{ if } \alpha_k(s(t,f)) = \alpha_k(s^*(t,f)), \text{ else } V_k(s,s^*) = -\log[1 - \exp-\beta|s(t,f)^2 - s^*(t,f)^2|]. \quad (8)$$

For a given k, values of $\alpha_k(s(t,f))$ that minimize $E_k(\alpha_k(s(t,f)))$ may be determined in accordance with an embodiment using, by way of example, a Belief Propagation algorithm such as a loopy Belief Propagation algorithm.

In a block 108 processor 34 optionally determines a frequency signature, $FSIG_g(f)$, as a function of frequency f for a g-th identified transmitter. For a given frequency f, $FSIG_g(f)$ may be defined as an average of, the optionally, smoothed $\alpha_g(t,f)$ over time t, and in symbols, $$FSIG_g(f) = \Sigma_{t_1}^{tT} \alpha_g(t,f)/T. \quad (9)$$

$FSIG_g(f)$ provides a measure of a portion of the time that the identified g-th RF transmitter transmits electromagnetic energy at frequency f.

Optionally, in a block 110 processor 34 uses $FSIG_g(f)$ to determine a bandwidth for the g-th identified transmitter. In an embodiment, the bandwidth determined by processor 34 is equal to a continuous span of frequencies for which $FSIG_g(f)$ has values greater than 0. Optionally, the bandwidth is equal to a continuous span of frequencies for which $FSIG_g(f)$ has values greater than an FSIG threshold value. In an embodiment the FSIG threshold value is equal to a percent, also referred to as an FSIG threshold percent of a maximum value for $FSIG_g(f)$. Optionally the FSIG threshold percent is less than or equal to about 30%. Optionally the FSIG threshold percent is less than or equal to about 20%

In a block 112, processor 34 optionally determines a temporal signature, $TSIG_g(t)$, for a g-th identified transmitter as a function of time t. For a given time t, $TSIG_g(t)$ may be defined as an average of $\alpha_g(t,f)$ over frequency f, and in symbols, $$TSIG_g(t) = \Sigma_{f_1}^{fF} \alpha_g(t,f)/F. \quad (10)$$

For a time t during a period for T for which RF-Sleuth 20 acquires RF power measurements $s(t,f)^2$, $TSIG_g(t)$ provides a measure of whether the g-th identified RF transmitter is transmitting.

Optionally, in a block 114 processor 34 uses $TSIG_g(t)$ to determine a percentage of time T, a use duty cycle, for which the g-th identified transmitter uses its bandwidth. In an embodiment, processor 34 determines the use duty cycle for the g-th transmitter as a percentage of time T for which $TSIG_g(t)$ has values greater than 0. Optionally, the use duty cycle is equal to a fraction of time T for which $TSIG_g(t)$ has values greater than a TSIG threshold value. In an embodiment the TSIG threshold is equal to a fraction, also referred to as an TSIG threshold percent of a maximum value for $TSIG_g(t)$. Optionally, the TSIG threshold percent is less than or equal to about 30%. Optionally the TSIG threshold fraction is less than or equal to about 20%.

In an embodiment, optionally in a block 116, processor 34 determines variances, $\sigma_g^2 T$ of $TSIG_g(t)$ and $\sigma_g^2 F$ of $FSIG_g(f)$, and optionally in a block 116, the processor uses $\sigma_g^2 T$ and $\sigma_g^2 F$ to discriminate RF transmitter types and determine a transmitter type for the g-th transmitter. For example, it is expected that a TV broadcast transmitter, which relatively continuously, transmits over a full width of an assigned, relatively large bandwidth broadcast channel, will exhibit relatively small variances in $TSIG_g(t)$ and $FSIG_g(f)$. And whereas a time division multiple access (TDMA) RF transmitter is expected to exhibit a relatively low variance of $FSIG_g(f)$ for a narrow bandwidth frequency channel to which it is assigned, the TDMA transmitter is expected to exhibit a relatively large variance in $TSIG_g(t)$. On the other hand, a frequency division multiple access (FDMA) transmitter is expected to exhibit a relatively small $FSIG_g(f)$ variance and a relatively large $TSIG_g(t)$ variance. A frequency hopping transmitter is expected to exhibit a relatively large variances for both $FSIG_g(f)$ and $TSIG_g(t)$.

Therefore, in an embodiment of the disclosure, processor 34 may be configured to classify a g-th identified transmitter identified for city environment 60 responsive to variances of its $FSIG_g(f)$ and/or $TSIG_g(t)$. The RF transmitter may be classified as a TV broadcast transmitter if the transmitter exhibits relatively small variances for both $FSIG_g(f)$ and $TSIG_g(t)$, and as a TDMA transmitter if the transmitter exhibits a relatively small $FSIG_g(f)$ variance and a relatively large $TSIG_g(t)$ variance. The processor may classify the identified transmitter as an FDMA transmitter if the transmitter exhibits a relatively large $FSIG_g(f)$ variance but a relatively small $TSIG_g(t)$ variance, and as a frequency hopping transmitter if the transmitter exhibits relatively large variances for both $FSIG_g(f)$ and $TSIG_g(t)$.

In an embodiment, processor 34 compares a $FSIG_g(f)$ or $TSIG_g(t)$ variance that an RF transmitter exhibits to a threshold $FSIG_g(f)$ or $TSIG_g(t)$ variance respectively to determine if the exhibited threshold is relatively large or relatively small. In an embodiment a threshold $FSIG_g(f)$ or $TSIG_g(t)$ variance may be equal to a percent of a maximum value of the $FSIG_g(f)$ or $TSIG_g(t)$ that processor 34 determines for the transmitter. In an embodiment the percent is greater than or about equal to about 10%. Optionally, the percent is greater than or about equal to about 20%.

In an embodiment of the disclosure, processor 34 may fit an RF-PMM($s(t,f)^2$) probability mixture model, discussed above by way of example with reference to block 104 of flow diagram 100, to RF power measurements $s(t,f)^2$ that RF-Sleuth 20 acquires in accordance with any suitable fitting procedure. Processor 34 may be configured to use an Expectation-Maximization (EM) algorithm in accordance with an embodiment of the disclosure to fit an RF-PMM(s(t,f)$^2$) to power measurements s(t,f)$^2$. For example, assume that processor 34, in accordance with an embodiment of the disclosure, models RF power measurements for transmissions in city environment 60 as the Rayleigh-Gaussian distribution noted above in expression (4), and repeated below as expression (11) for convenience, $$\text{RF-RGMM}(s(t,f)^2) = \Sigma_{g=1}^{G} \omega_g R_g(s, \lambda_g) + \omega_n N(s, \mu_n, \sigma_n^2). \quad (11)$$

In an embodiment of the disclosure processor 34 determines initial values for defining parameters $\theta_{RGMM}$ of RF-RGMM(s(t,f)$^2$) by fitting an RF-Gaussian Mixture Model, $$\text{RF-GMM}(s(t,f)^2) = \Sigma_{j=1}^{J} \omega_j [1/(\sigma_j \sqrt{(2\pi)}) \exp{-[(s-\mu_j)^2/2\sigma_j^2]}], \quad (12)$$

for which J=G+1, to the RF power measurements s(t,f)$^2$ using any of various GMM algorithms. The processor uses values for defining parameters, $\theta_{GMM}$, of RF-GMM(s(t,f)$^2$) determined by fitting RF-GMM(s(t,f)$^2$) to the RF power measurements as initial values for the EM algorithm used to fit the Rayleigh-Gaussian distribution RF-GMM(s(t,f)$^2$) to the RF power measurements. In particular, to initialize the EM fitting algorithm, processor 34 may use $\mu_j$, $1 \leq j \leq G$, determined for RF-GMM(s(t,f)$^2$) as initial values for $\lambda_g$, $1 \leq g \leq G$, respectively, and $\mu_J$ and $\sigma_J$ determined for RF-GMM (s(t,f)$^2$) as initial values for $\mu_n$ and $\sigma_n$.

Thereafter, for an "i-th" iteration of the EM algorithm, variables for the Expectation step of the algorithm may be determined from the formulae, $$p_i(s \in g) = R_g(s, \lambda_g(i)) / [\Sigma_{g=1}^{G} \omega_g(i) R_g(s, \lambda_g(i)) + \omega_n(i) N(s, \mu_n(i), \sigma_n(i)^2)]; \quad (13)$$

and $$p_i(s \in n) = N(s, \mu_n(i), \sigma_n(i)^2) / [\Sigma_{g=1}^{G} \omega_g(i) R_g(s, \lambda_g(i)) + \omega_n(i) N(s, \mu_n(i), \sigma_n(i)^2)]. \quad (14)$$

In expressions (13) and (14), $p_i(s \in g)$ is a probability that an RF power measurement s(t,f)$^2$ was acquired responsive to reception of an RF signal transmitted by the g-th transmitter and $p_i(s \in n)$ is a probability that the RF power measurement was acquired responsive to reception of RF noise.

For the Maximization step of the i-th iteration:

$$\lambda_g(i+1) = \Sigma_s s \cdot p_i(s \in g) / \Sigma_s p_i(s \in g); \quad (15)$$

$$\omega_g(i+1) = \Sigma_s p_i(s \in g) / \Sigma_{s,g} p_i(s \in g); \quad (16)$$

$$\mu_n(i+1) = \Sigma_s s \cdot p_i(s \in n) / \Sigma_s p_i(s \in n); \quad (17)$$

$$\sigma_n(i+1)^2 = \Sigma_s (s - \mu_n(i))^2 \cdot p_i(s \in n) / \Sigma_s p_i(s \in n); \quad (18)$$

and $$\omega_n(i+1) = \Sigma_s p_i(s \in n) / \Sigma_{s,g} p_i(s \in g). \quad (19)$$

In equations (15)-(19), $\Sigma_s$ refers to a sum over all RF power measurements s(t,f)$^2$ to which the Rayleigh-Gaussian distribution RF-GMM(s(t,f)$^2$) is being fit and $\Sigma_{s,g}$ refers to a sum over all the RF power measurements and all the identified G RF transmitters. The EM iteration process ends when a fit of RF-RGMM(s(t,f)$^2$) to the RF power measurements satisfies a desired goodness of fit criterion or the parameters $\theta_{RGMM}$ for RF-RGMM(s(t,f)$^2$) converge.

Figure 3:
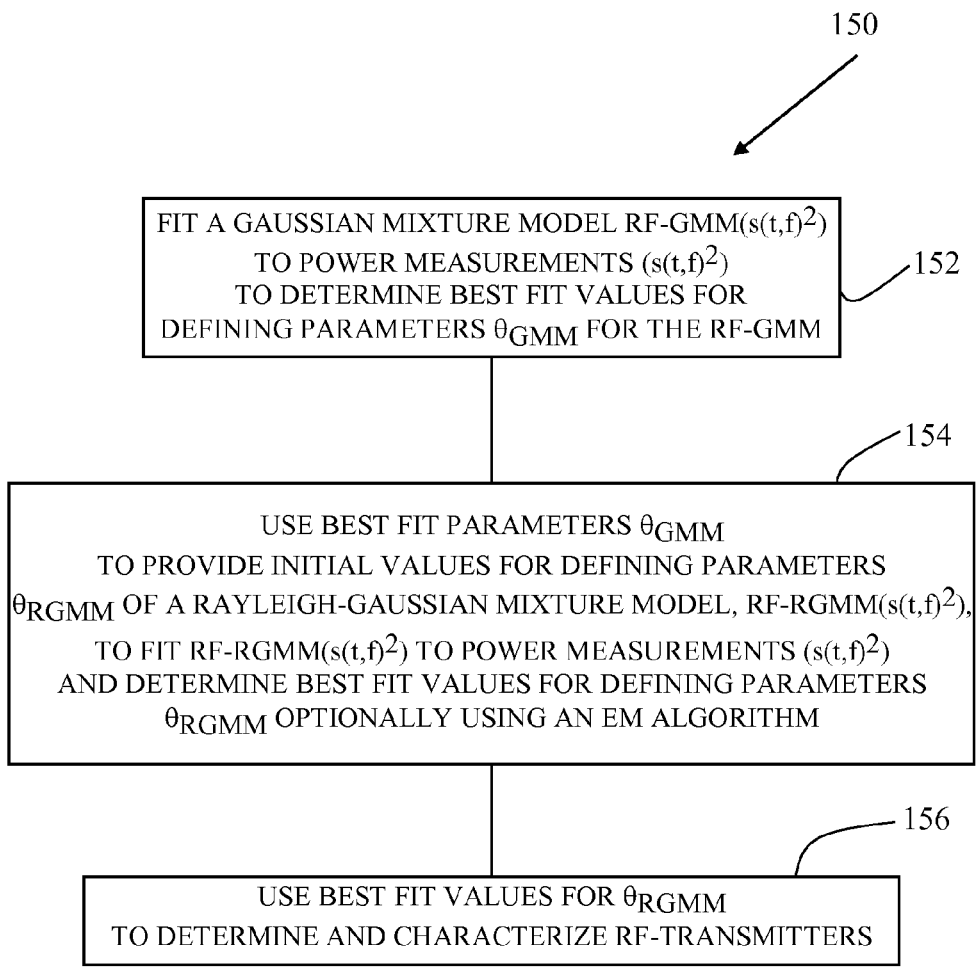
FIG. 3 shows a flow diagram of a procedure by which the RF-Sleuth shown in FIG. 1 fits an RF-PMM comprising Rayleigh and Gaussian PDF to RF power measurements to identify RF transmitters in the city environment, in accordance with an embodiment of the disclosure.

The above fitting procedure is summarized in a flow diagram 150 shown in FIG. 3. In a block 152 of the flow diagram processor 34 optionally fits a Gaussian mixture model RF-GMM(s(t,f)$^2$) to power measurements (s(t,f)$^2$) to determine best fit values for defining parameters $\theta_{GMM}$ of the RF-GMM. In a block 154 processor 34 uses parameters $\theta_{GMM}$ to provide initial values for fitting a Rayleigh-Gaussian mixture model, RF-RGMM(s(t,f)$^2$), to RF power measurements (s(t,f)$^2$) and determining best fit values for defining parameters $\theta_{RGMM}$ of RF-RGMM(s(t,f)$^2$), optionally using an EM algorithm. Optionally in a block 156, processor 34 uses best fit values of $\theta_{RGMM}$ to determine a number of RF transmitters in city environment 60 and characteristics of the transmitters.

Whereas flow diagram 150 illustrates an algorithm that may be used in an "holistic" fitting process in which substantially all data in PSD data matrix 28 (FIG. 1B) is used in evaluating each of the variables in the procedure, an RF-PMM(s(t,f)$^2$) may be fit to RF power measurements s(t,f)$^2$ in the PSD data matrix using a "multi-scale" fitting procedure in accordance with an embodiment of the disclosure. In a multi-scale procedure, PSD data matrix 28 is iteratively partitioned into consecutively smaller data sub-blocks, and RF power measurements s(t,f)$^2$ in different data sub-blocks may be used independently of data in other sub-blocks in evaluating variables in the procedure.

Figure 4:
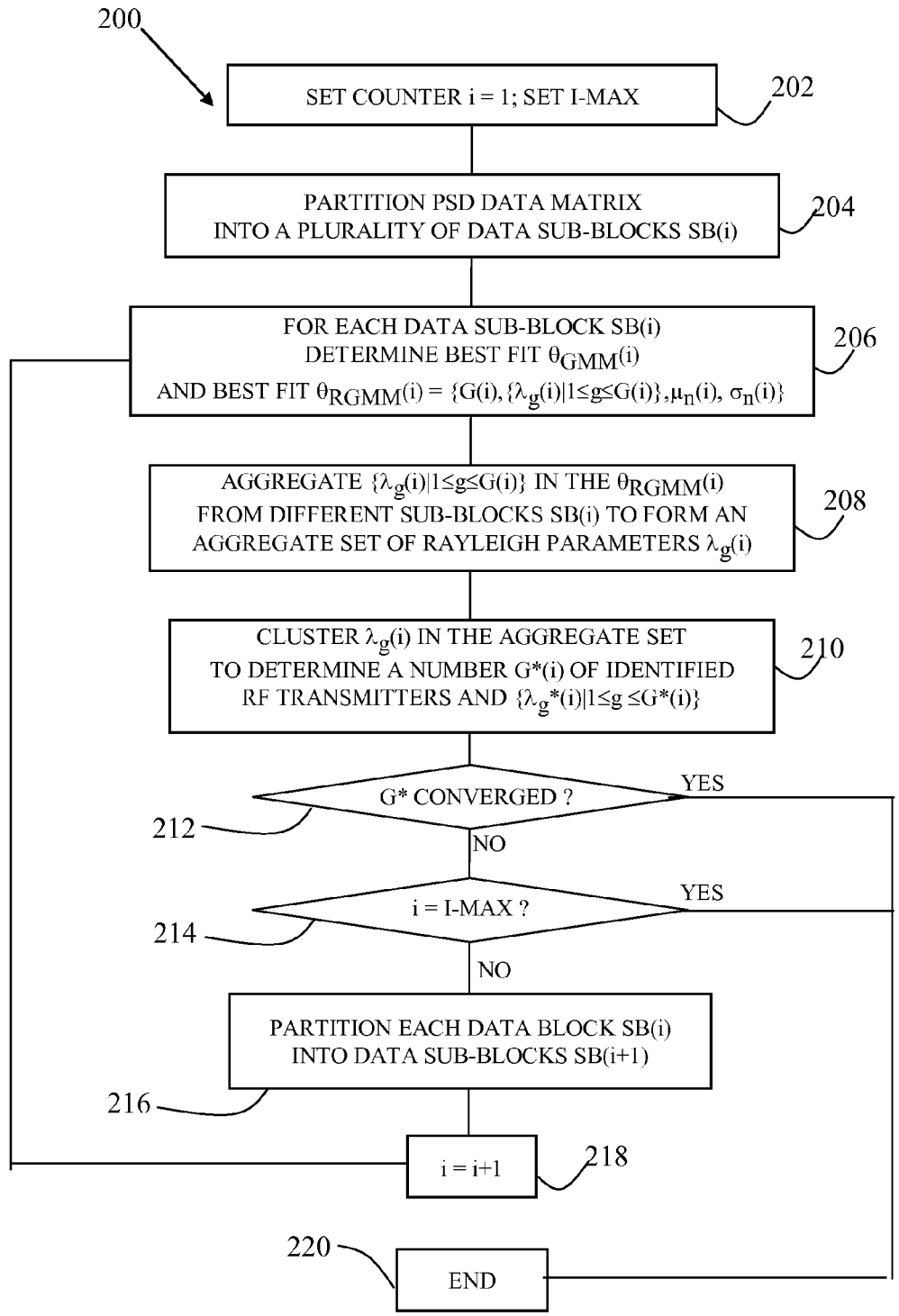
FIG. 4 shows a detailed flow diagram of a procedure by which the RF-Sleuth shown in FIG. 1 determines features of the identified RF-transmitters, in accordance with an embodiment of the disclosure.

FIG. 4 shows a flow diagram of a multi-scale fitting algorithm 200 that processor 34 may execute optionally to identify RF transmitters in city environment 60, in accordance with an embodiment of the disclosure. In a block 202 the processor optionally sets an iteration counting variable "i" equal to 1 and sets a variable I-MAX equal to a maximum value for the iteration counting variable. In a block 204 processor 34 partitions PSD data matrix 28 (FIG. 1B) into a plurality of data sub-blocks, "SB(i)", (not shown). Optionally, the data sub-blocks SB(i) are non-overlapping. In an embodiment, the data sub-blocks SB(i) may have substantially a same size, and each data sub-block may have a same number of rows and columns of RF power measurements s(t,f)$^2$.

In a block 206 processor 34 fits, optionally, a Rayleigh-Gaussian PDF RF-RGMM(s(t,f)$^2$) to data in each sub-block SB(i) independently of data in other sub-blocks SB(i) of the i-th iteration. Optionally, fitting an RF-RGMM(s(t,f)$^2$) to the data in a given sub-block SB(i) of the i-th iteration is a process similar to that described with respect to blocks 152 and 154 in flow diagram 150 shown in FIG. 3. And as in flow diagram 150, the fitting process may comprise first fitting an RF-GMM((s(t,f)$^2$ to the data in the given sub-block SB(i) to determine a best fit $\theta_{GMM}(i)$ for the data and using the best fit $\theta_{GMM}(i)$ to initialize fitting an RF-RGMM(s(t,f)$^2$) to the data in the given sub-block to determine a best fit $\theta_{RGMM}(i)$ for the data in the given sub-block SB(i). The best fit $\theta_{RGMM}(i)$ for the RF-RGMM(s(t,f)$^2$) for each given sub-block SB(i) of the i-th iteration comprises a value G(i) for a number of RF transmitters identified in the RF-RGMM(s(t, f)$^2$) for the given sub-block, a set of Rayleigh parameters $\{\lambda_g(i) | 1 \leq i \leq G(i)\}$ for the Rayleigh PDFs $R_g(s, \lambda_g)$ of the identified RF transmitters, and $\mu_n(i)$ and $\sigma_n(i)$ for the noise PDF in the RF-RGMM(s(t,f)$^2$) determined for the given sub-block.

In a block 208 processor 34 may aggregate the Rayleigh parameters $\lambda_g(i)$ in the $\theta_{RGMM}(i)$ from different sub-blocks SB(i) to form an aggregate set of Rayleigh parameters. The processor clusters the Rayleigh parameters $\lambda_g(i)$ in the aggregate set, optionally in a block 210, to generate clusters of related $\lambda_g(i)$. In an embodiment two Rayleigh parameters $\lambda_g(i)$ may be considered related if a difference between their respective average powers, $4\lambda_g^2/\pi$, is less than a threshold difference. Optionally the threshold difference is equal to or less than about 2 dBm (decibel-milliwatt). Processor 34 may determine that a number G*(i) of RF transmitters identified for city environment 60 at the i-th iteration is equal to the number of different clusters generated by clustering the Rayleigh parameters $\lambda_g(i)$ at the i-th iteration. Each of the $G^*(i)$ identified RF transmitters is associated with a different cluster and processor 34 assigns an identified g-th, $1 \leq g \leq G^*(i)$, RF transmitter a Rayleigh parameter $\lambda_g^*(i)$ that is a function of the Rayleigh parameters $\lambda_g(i)$ in the cluster with which the RF transmitter is associated. Optionally, $\lambda_g^*(i)$ is an average of the $\lambda_g(i)$ in its cluster. Optionally in a decision block 212, processor 34 determines whether the value for $G^*(i)$ for the i-th iteration indicates that the number of identified RF transmitters has converged to a limit. If processor 34 determines that the number of identified RF transmitters has converged, the processor proceeds to a block 220 to end execution of the multi-scale fitting algorithm. Otherwise, processor 34 optionally proceeds to a decision block 214.

In a decision block 214 processor decides if i=I-MAX. If processor 34 determines that i is equal to I-MAX the processor proceeds to block 220 to end execution of the multi-scale fitting algorithm. Otherwise, the processor proceeds optionally to a block 216, and partitions each data sub-block SB(i) into a plurality of sub-blocks SB(i+1). Optionally, a number of sub-blocks SB(i+1) in a given sub-block SB(i) is equal to the number of sub-blocks SB(i). Optionally, sub-blocks SB(i+1) are non overlapping. Each sub-block SB(i+1) optionally has a same number of rows and columns of RF power measurements $s(t,f)^2$.

Subsequent to partitioning in block 216, processor 34 may proceed to a block 218 to increase i by one and then, optionally, return to block 206 to perform another iteration of the multi-scale procedure. A multi-scale algorithm in accordance with an embodiment of the disclosure may be advantageous in providing accurate determinations of a number of RF transmitters operating in an environment. Simulations indicate that use of a multi-scale algorithm to identify and estimate of a number of RF transmitters operating in an environment may provide more accurate results than use of other algorithms, such as an Edge Detection algorithm.

It is noted that in the above discussion an example embodiment of the disclosure described an RF-Sleuth as fitting a PMM comprising a Gaussian PDF and a plurality of Rayleigh PDFs to RF power measurements. However, an RF-Sleuth in accordance with an embodiment is not limited to a PMM comprising a single Gaussian and a plurality of Rayleigh PDFs. An RF-Sleuth in accordance with an embodiment may use a PMM comprising one or more PDFs from each of any number of different types of PDFs suitable for modeling RF transmissions from RF transmitters. For example a PMM in accordance with an embodiment may comprise one or more Gaussian PDFs, one or more Rayleigh PDFs, and one or more Ricean PDFs.

It is also noted that an RF-Sleuth in accordance with an embodiment of the disclosure may benefit from, but does not require training on labeled examples of RF signals transmitted by RF transmitters or require data defining known RF transmission characteristics for transmitters in an environment to identify RF transmitters in the environment. An RF-sleuth may therefore be advantageous for detecting rogue transmitters in an environment and tracking changes in bandwidths and/or use duty cycles of transmitters operating in the environment. As a result an RF-Sleuth may be advantageous in managing RF spectrum in the environment.

There is therefore provided in accordance with an embodiment of the disclosure a system for identifying radio frequency (RF) transmitters in an environment, the apparatus comprising: at least one RF listening station configured to receive RF signals and acquire measurements of their RF power as a function of reception time, t, and frequency f; and a processing hub configured to identify RF transmitters operating in the environment by: receiving the RF power measurements; fitting to the RF power measurements a probability mixture model (PMM) that provides a probability density as a function of magnitude of the RF power measurements, the PMM comprising a plurality of probability density functions (PDFs), at least two of which PDFs are of a different type; and identifying RF transmitters in the environment responsive to the PMM. Optionally, fitting comprises determining a set of defining parameters $\theta_{PMM}$ for the PMM, the defining parameters comprising a number, "K", for a number of the plurality of PDFs, and for each PDF, parameters defining the PDF.

Fitting optionally comprises: iteratively partitioning the RF power measurements into a plurality of sub-blocks of power measurements; for each given sub-block in an i-th iteration fitting a sub-block PMM comprising a plurality of sub-block PDFs to the RF power measurements in the given sub-block independent of RF power measurements in other sub-blocks of the i-th iteration to determine a set of defining parameters for the sub-block PMM, the set of defining parameters for the sub-block PMM having a number for the plurality of PDFs in the sub-block PMM; clustering sub-block PDFs from different sub-blocks to determine clusters of PDFs; and determining K responsive to a number of clusters. Additionally or alternatively identifying RF transmitters may comprise assuming that the number of RF transmitters in the environment is equal to K and associating each RF transmitter with a different one of the K PDFs.

In an embodiment, the processing hub is configured to determine for each of a plurality of the RF power measurements an association probability for the RF power measurement and each of at least one of the identified K RF transmitters that provides a measure of the probability that an RF signal for which the RF power measurement was acquired was transmitted by the identified RF transmitter. Optionally, an association probability for the RF power measurement and a given identified RF transmitter of the K identified RF transmitters is a function of the PDF associated with the identified RF transmitter evaluated at a magnitude of the RF power measurement.

Additionally or alternatively, the processing hub may be configured to use the association probabilities for a given RF transmitter of the K identified transmitters to determine an RF bandwidth of the identified given RF transmitter. Optionally, using the association probabilities to determine the RF bandwidth comprises integrating the association probabilities over time t for each of a plurality of frequencies f to determine a function of frequency for the given RF transmitter and using the function of frequency to determine a bandwidth of the given RF transmitter. Using the function of frequency to determine the bandwidth may comprise identifying a range of frequencies for which the function of frequency f is substantially greater than zero, and determining the range of frequencies as a bandwidth of the given RF transmitter.

Additionally or alternatively the processing hub may be configured to use the function of frequency to classify the RF transmitter as to type of RF transmitter. Using the function of frequency to classify the RF transmitter may comprise determining a standard deviation for the function of frequency and using the standard deviation to classify the identified RF transmitter.

In an embodiment the processing hub is configured to use the association probabilities for a given RF transmitter of the K identified transmitters to determine a use duty cycle for the identified RF transmitter that provides a percentage of time that the identified RF transmitter transmits. Optionally, using the association probabilities to determine the use duty cycle comprises integrating the association probabilities over frequency f to determine a function of time t for the given RF transmitter and using the function of time to determine a use duty cycle of the given RF transmitter. Optionally, determining the use duty cycle comprises using the function of time to determine a percentage of a time period for which the function of time is substantially greater than zero. Additionally or alternatively, the processing hub is configured to use the function of time to classify the RF transmitter as to type of RF transmitter. Using the function of time to classify the RF transmitter may comprise determining a standard deviation for the function of time and using the standard deviation to classify the identified RF transmitter.

In an embodiment, the PMM comprises two different types of PDFs optionally chosen from a group comprising: a Gaussian PDF, a Rayleigh PDF, and a Ricean PDF.

There is further provided in accordance with an embodiment of the disclosure, a method for monitoring radio frequency (RF) transmitters in an environment, the method comprising: acquiring RF power measurements as a function of reception time, t, and frequency f for RF signals in an environment; and fitting to the RF power measurements a probability mixture model (PMM) that provides a probability density as a function of magnitude of the RF power measurements wherein the PMM comprises a plurality of probability density functions (PDFs), at least two of which PDFs have a different form; and identifying a number of RF transmitters operating in the environment responsive to the PMM; determining association probabilities for the RF power measurements and the identified RF transmitters; and using the association probabilities to determine bandwidths for the identified RF transmitters. Optionally the method comprises using the association probabilities to determine use duty cycles for the identified RF transmitters.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. A system for identifying radio frequency (RF) transmitters in an environment, the system comprising:
at least one RF listening station configured to receive RF signals and acquire measurements of their RF power as a function of reception time, t, and frequency f; and
a processing hub configured to identify RF transmitters operating in the environment by:
receiving the RF power measurements;
fitting to the RF power measurements a probability mixture model (PMM) that provides a probability density as a function of magnitude of the RF power measurements, the PMM comprising a plurality of probability density functions (PDFs), at least two of which PDFs are of a different type, the fitting comprising:
determining a set of defining parameters $\theta_{PMM}$ for the PMM, the defining parameters comprising a number, "K", for a number of the plurality of PDFs, and for each PDF, parameters defining the PDFs; and,
iteratively partitioning the RF power measurements into a plurality of sub-blocks of power measurements;
for each given sub-block in an i-th iteration fitting a sub-block PMM comprising a plurality of sub-block PDFs to the RF power measurements in the given sub-block independent of RF power measurements in other sub-blocks of the i-th iteration to determine a set of defining parameters for the sub-block PMM, the set of defining parameters for the sub-block PMM having a number for the plurality of PDFs in the sub-block PMM;
clustering sub-block PDFs from different sub-blocks to determine clusters of PDFs; and
determining K responsive to a number of clusters; and, identifying RF transmitters in the environment responsive to the PMM.

2. The system according to claim 1 wherein identifying RF transmitters comprises assuming that the number of RF transmitters in the environment is equal to K and associating each RF transmitter with a different one of the K PDFs.

3. The system according to claim 1 wherein the processing hub is configured to determine for each of a plurality of the RF power measurements an association probability for the RF power measurement and each of at least one of the identified K RF transmitters that provides a measure of the probability that an RF signal for which the RF power measurement was acquired was transmitted by the identified RF transmitter.

4. The system according to claim 3 wherein an association probability for the RF power measurement and a given identified RF transmitter of the K identified RF transmitters is a function of the PDF associated with the identified RF transmitter evaluated at a magnitude of the RF power measurement.

5. The system according to claim 3 wherein the processing hub is configured to use the association probabilities for a given RF transmitter of the K identified transmitters to determine an RF bandwidth of the identified given RF transmitter.

6. The system according to claim 5 wherein using the association probabilities to determine the RF bandwidth comprises integrating the association probabilities over time t for each of a plurality of frequencies f to determine a function of frequency for the given RF transmitter and using the function of frequency to determine a bandwidth of the given RF transmitter.

7. The system according to claim 6 wherein using the function of frequency to determine the bandwidth comprises identifying a range of frequencies for which the function of frequency f is substantially greater than zero, and determining the range of frequencies as a bandwidth of the given RF transmitter.

8. The system according to claim 6 wherein the processing hub is configured to use the function of frequency to classify the RF transmitter as to type of RF transmitter.

9. The system according to claim 8 wherein using the function of frequency to classify the RF transmitter comprises determining a standard deviation for the function of frequency and using the standard deviation to classify the identified RF transmitter.

10. The system according to claim 3 wherein the processing hub is configured to use the association probabilities for a given RF transmitter of the K identified transmitters to determine a use duty cycle for the identified RF transmitter that provides a percentage of time that the identified RF transmitter transmits.

11. The system according to claim 10 wherein using the association probabilities to determine the use duty cycle comprises integrating the association probabilities over frequency f to determine a function of time t for the given RF transmitter and using the function of time to determine a use duty cycle of the given RF transmitter.

12. The system according to claim 11 wherein determining the use duty cycle comprises using the function of time to determine a percentage of a time period for which the function of time is substantially greater than zero.

13. The system according to claim 11 wherein the processing hub is configured to use the function of time to classify the RF transmitter as to type of RF transmitter.

14. The system according to claim 13 wherein using the function of time to classify the RF transmitter comprises determining a standard deviation for the function of time and using the standard deviation to classify the identified RF transmitter.

15. The system according to claim 1 wherein the PMM comprises two different types of PDFs chosen from a group comprising: a Gaussian PDF, a Rayleigh PDF, and a Ricean PDF.

16. A method for monitoring radio frequency (RF) transmitters in an environment, the method comprising:
acquiring RF power measurements as a function of reception time, t, and frequency f for RF signals in an environment;
fitting to the RF power measurements a probability mixture model (PMM) that provides a probability density as a function of magnitude of the RF power measurements wherein the PMM comprises a plurality of probability density functions (PDFs), at least two of which PDFs have a different form;
identifying a number of RF transmitters operating in the environment responsive to the PMM:
determining association probabilities for the RF power measurements and the identified RF transmitters; and,
using the association probabilities to determine bandwidths for the identified RF transmitters; and use duty cycles for the identified RF transmitters.

17. A system for identifying radio frequency (RF) transmitters in an environment, the system comprising:
at least one RF listening station configured to receive RF signals and acquire measurements of their RF power as a function of reception time, t, and frequency f; and
a processing hub configured to identify RF transmitters operating in the environment by:
receiving the RF power measurements;
fitting to the RF power measurements a probability mixture model (PMM) comprising a plurality of probability density functions (PDFs) that provides a probability density as a function of magnitude of the RF power measurements, by iteratively partitioning the RF power measurements into a plurality of sub-blocks of power measurements; for each given sub-block in an i-th iteration fitting a sub-block PMM comprising a plurality of sub-block PDFs to the RF power measurements in the given sub-block independent of RF power measurements in other sub-blocks of the i-th iteration to determine a number for the plurality of sub-block PDFs in the sub-block PMM;
clustering sub-block PDFs from different sub-blocks to determine clusters of PDFs; and
determining a number, "K", for a number of transmitters in the environment, responsive to a number of clusters.

* * * * *